US012752744B2

(12) United States Patent
Depondt et al.

(10) Patent No.: US 12,752,744 B2
(45) Date of Patent: Oct. 6, 2026

(54) WIPER BLADE, IN PARTICULAR FOR A MOTOR VEHICLE

(71) Applicant: Robert Bosch GmbH, Stuttgart (DE)

(72) Inventors: Helmut Depondt, Boutersem (BE); Kris Smets, Halen (BE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 18/500,430

(22) Filed: Nov. 2, 2023

(65) Prior Publication Data

US 2024/0149835 A1 May 9, 2024

(30) Foreign Application Priority Data

Nov. 4, 2022 (DE) ..................... 10 2022 211 640.2

(51) Int. Cl.

*B60S 1/52* (2006.01)
*B60S 1/38* (2006.01)
*B60S 1/34* (2006.01)

(52) U.S. Cl.

CPC ............. *B60S 1/524* (2013.01); *B60S 1/3862* (2013.01); *B60S 1/3415* (2013.01); *B60S 1/522* (2013.01)

(58) Field of Classification Search

CPC ........ B60S 1/524; B60S 1/522; B60S 1/3415; B60S 1/3862

USPC .......................... 15/250.201, 250.04, 250.43

See application file for complete search history.

(56) References Cited

U.S. PATENT DOCUMENTS 8,381,348 B2 * 2/2013 Egner-Walter ........ B60S 1/3805 15/250.07
2008/0263806 A1 * 10/2008 Egner-Walter ............ B60S 1/40 15/250.01
2017/0225661 A1 * 8/2017 Shimoyama .............. B60S 1/38

FOREIGN PATENT DOCUMENTS

DE 102004007351 A1 * 9/2005 ............ B60S 1/3849
DE 102018200316 A1 7/2019
EP 3210841 A1 * 8/2017
FR 3000001 A1 6/2014
WO WO-2009132982 A1 * 11/2009 ............ B60S 1/3862

* cited by examiner

*Primary Examiner* — Katina N. Henson

(74) *Attorney, Agent, or Firm* — Michael Best & Friedrich LLP

(57) ABSTRACT

A wiper blade in particular for a motor vehicle. This comprises at least one distribution element comprising at least one supply channel for cleaning liquid, as well as a first spray bar for dispensing cleaning liquid, according to the invention the supply channel comprises a first supply section for the first spray bar and a second supply section for a second spray bar and at least one narrowing in the second supply section.

12 Claims, 4 Drawing Sheets

WIPER BLADE, IN PARTICULAR FOR A MOTOR VEHICLE

BACKGROUND

The invention relates to a wiper blade, in particular for a motor vehicle.

Numerous wiper blades for automobiles are already known, for example from DE 10 2018 200316 A1, which comprise a distributor element comprising at least one supply channel for cleaning liquid, as well as a first spray bar for dispensing cleaning liquid.

The object of the invention is to improve such wiper blades in view of an even better wiping result and higher efficiency.

SUMMARY

The wiper blade according to the invention has the advantage that the supply channel comprises a first supply section for the first spray bar and a second supply section for a second spray bar and at least one narrowing is provided in the second supply section. This improves cleaning performance without increasing the consumption of cleaning fluid.

In a simple, inexpensive and therefore advantageous embodiment, the distribution element is arranged in an adapter provided for connection to a wiper arm.

Furthermore, in a simple and therefore advantageous embodiment, the second supply section comprises at least one nozzle provided for connection to the second spray bar, wherein the narrowing is arranged in the nozzle.

Advantageously, the second supply section has a smaller passage than the first supply section, at least in segments. This is particularly effective.

Good cleaning performance is advantageously achieved by having at least the first spray bar and/or second spray bar run along a longitudinal extension of the wiper blade and having at least one spray opening.

In this case, it is particularly advantageous if the first spray bar runs from the distribution element in the direction of one end of the longitudinal extension and the second spray bar runs from the distribution element in the direction of another end of the longitudinal extension.

It is particularly effective and therefore advantageous if one inner circle side is provided along the longitudinal extension and the second spray bar is arranged on the inner circle side.

Advantageously, the spray bar comprises a channel with a plurality of spray openings, so that there is an even water distribution on the glass to be cleaned.

In a simple, low-cost and therefore advantageous embodiment, the spray bar is configured integrally with a wind deflection bar.

A simple and therefore advantageous distribution element is configured at least in two parts, wherein at least one part is configured from plastic, in particular as an injection molding part.

BRIEF DESCRIPTION OF THE DRAWINGS

Various exemplary embodiments of the invention are shown in the drawings and explained in more detail in the following description. The following are shown.

DETAILED DESCRIPTION

Figure 1:
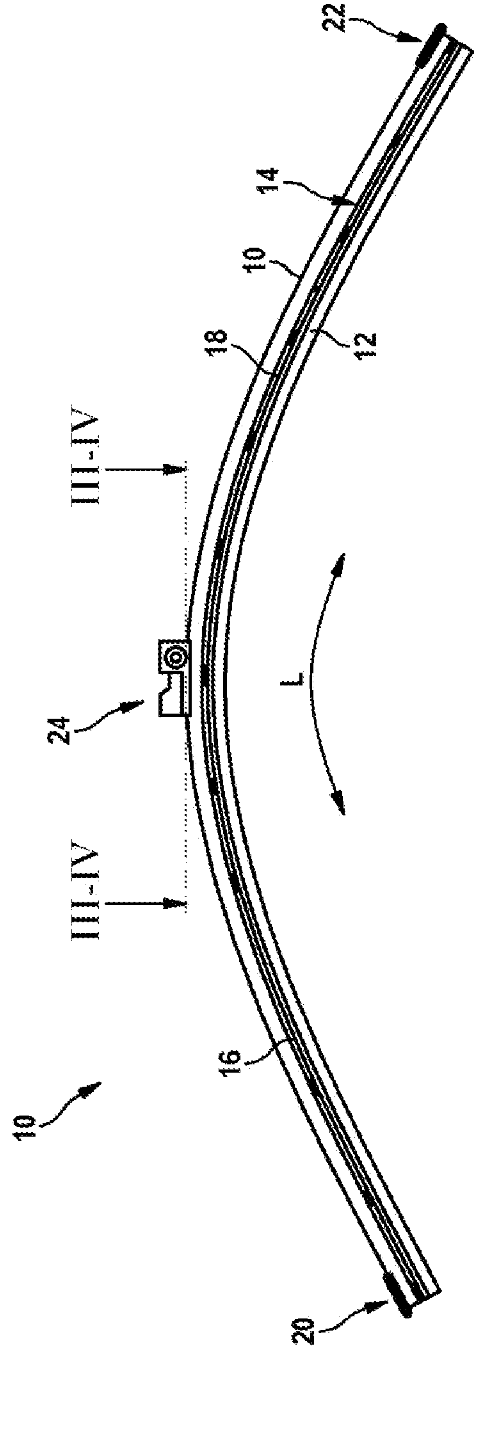
FIG. 1 a wiper blade according to the invention in a schematic side view.

In FIG. 1, a wiper blade 10 according to the invention is shown in a schematic side view.

The wiper blade 10 according to the invention comprises a wiping strip 12, which has a longitudinal extension L. The wiping strip 12 is held by a carrier 14, which, like the wiping strip 12, extends across the substantially entire longitudinal extension L of the wiper blade 10.

A first spray bar 16 and a second spray bar 18 are further arranged on the carrier 14, from which cleaning liquid can be applied to glass to be wiped during operation.

Figure 2:
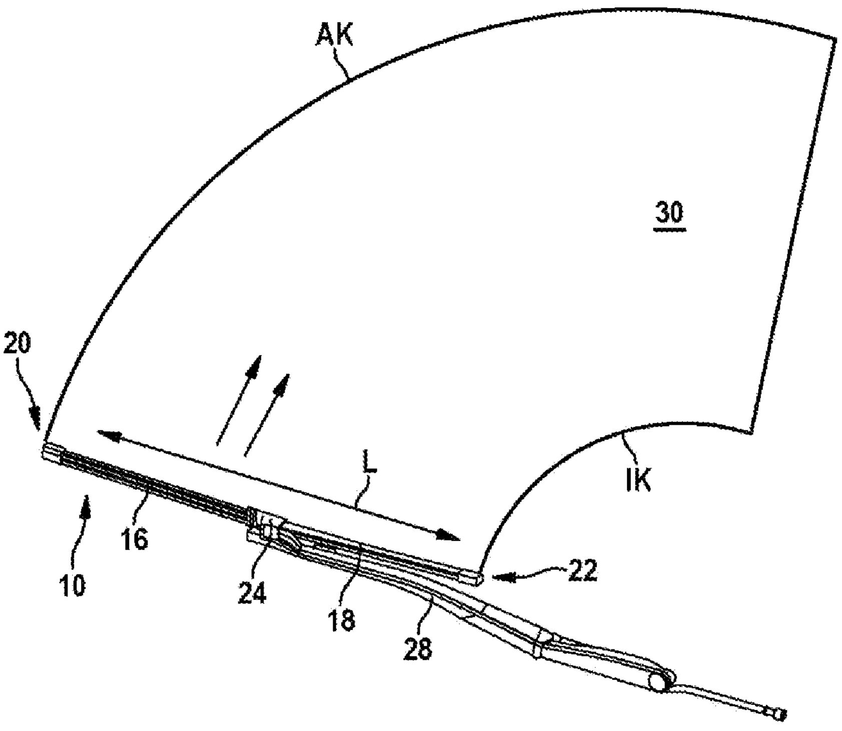
FIG. 2 a wiper blade according to the invention in the mounted position.

With respect to the longitudinal extension L of the wiper blade 10, an adapter 24 is arranged approximately centrally between a first end 20 and a second end 22, which terminate the wiper blade 10 along its longitudinal extension L, with which the wiper blade 10 can be attached to a wiper arm 28 (FIG. 2).

A wind deflection bar 26 is further arranged on the carrier 14. The wiping strip 12, the adapter 24, and the wind deflection bar 26 are attached to a spring bar, which consists essentially of strip steel, which is curved in a relaxed state and is coated with a plastic layer or a lacquer. The curvature of the strip steel is such that the wiping strip 12 is pressed onto the glass to be wiped in a mounted state on curved glass over the substantially entire longitudinal extension L.

In FIG. 2, the wiper blade 10 according to the invention is shown schematically in the mounted position.

The wiper blade 10 is attached to the wiper arm 28 by means of the adapter 24. During operation, the wiper arm 28 performs an oscillating movement such that the wiper blade 10 sweeps a portion of a circular ring as the wiping region 30. Thus, an outer circle AK and an inner circle IK of the wiping region 30 results, wherein the area swept by the first end 20 of the wiper blade 10 forms the outer circle AK and the area swept by the second end 22 of the wiper blade 10 forms the inner circle IK. Due to the oscillating movement during operation, the radius of the inner circle IK is naturally much smaller than the radius of the outer circle AK. As a result, the distance of the outer circle AK swept by the first end 20 is therefore greater than the distance of the inner circle IK swept by the second end 22.

The first spray bar 16 is tubular and runs from the adapter 24 in the direction of the first end 20 of the wiper blade 10. The second spray bar 18 is also tubular and runs from the adapter 24 in the direction of the second end 22 of the wiper blade 10.

Along the longitudinal extension L of the wiper blade 10, the first spray bar 16 is thus arranged on the side of the outer circle AK and the second spray bar 18 on the side of the inner circle IK.

Both the first spray bar 16 and the second spray bar 18 each have at least one, in this case several, spray openings 32 (FIG. 3) through which cleaning fluid, which is introduced into the first spray bar 16 and the second spray bar 18 by a distribution element 34 (FIG. 3) arranged in the adapter 24, is distributed in the wiping region 30.

The second spray bar 18, or the spray openings 32 of the second spray bar 18, provide cleaning liquid to the area facing the inner circle IK along the longitudinal extension L of the wiper blade 10.

The first spray bar 16, or the spray openings 32 of the first spray bar 16, is provided to supply the area along the longitudinal extension L of the wiper blade 10 with cleaning liquid, which faces the outer circle AK.

In a variation of the invention, only two spray openings 32 may also be provided. In this case, one of the two spray openings 32 may be arranged in the region of the first end 20 and the other spray opening 32 provided in the region of the second end 22 of the wiper blade 10.

If the two spray openings 32 are arranged in the area of the first end 20 and in the area of the second end 22 of the wiper blade 10, they can each spray at least partially in the direction of the adapter 24, such that during operation the wiping region 30 is substantially wetted with cleaning liquid along the entire longitudinal extension L. In this context, at least in part, it is intended to mean that at least one directional component of the central spray direction faces in the corresponding direction, i.e., in the direction of the adapter 24.

In a further variation, the first spray bar 16 and/or the second spray bar 18 having the spray openings 32 may also be arranged in the adapter 24. In this case, the spray openings 32 of the first spray bar 16 spray cleaning liquid at least partially in the direction of the first end 20 of the wiper blade 10, the spray openings 32 of the second spray bar 18 then spray cleaning liquid at least partially in the direction of the second end 22 of the wiper blade 10. In this context, at least in part, it is intended to mean that at least one directional component of the central spray direction faces in the corresponding direction, i.e., in the direction of the first end 20 or the second end 22.

Figure 3:
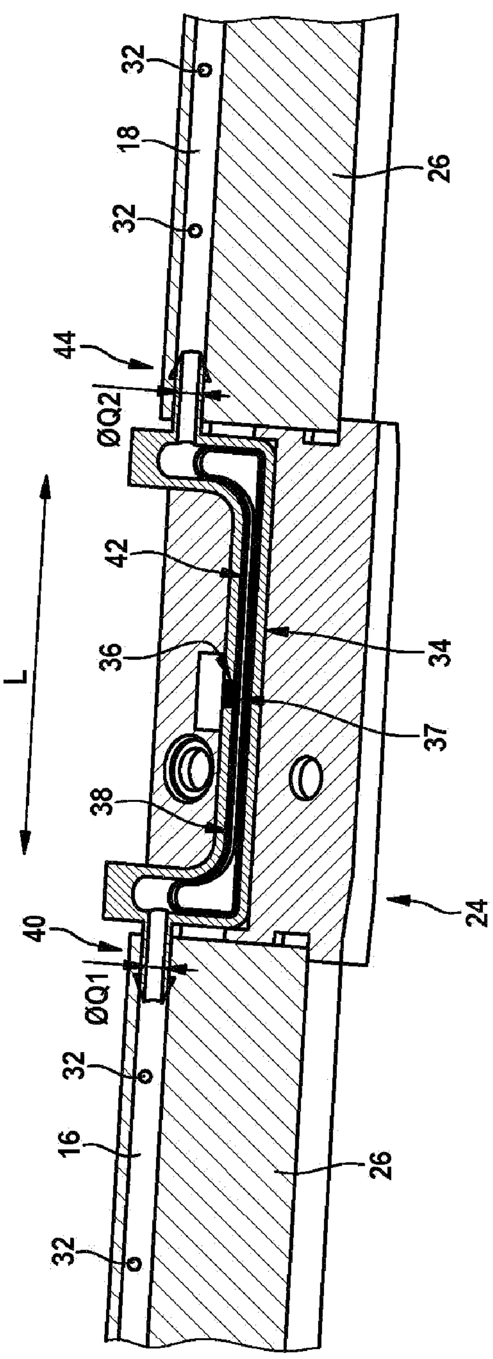
FIG. 3 the area of the distribution element of a wiper blade according to the invention, and FIG. 4 the distribution element and the spray bars of a wiper blade according to the invention in detail.

In FIG. 3, a longitudinal section through a distribution element 34 arranged in the adapter 24 as well as the adjacent first spray bar 16 and the second spray bar 18 is shown.

The first spray bar 16 and the second spray bar 18 are integrated in the wind deflection bar 26. This first spray bar 16 and the second spray bar 18 are therefore configured with the wind deflection bar 26, which is configured in two parts.

The wind deflection bar 26 is made of a single or multi-component plastic, in particular in an extrusion process. The spray openings 32 are introduced by laser drilling and all have the same diameter.

The diameter of the spray openings 32 is less than 1 mm, in particular less than 0.5 mm, preferably about 0.3 mm.

The distribution element 34 comprises an inlet 36 arranged approximately centrally with respect to the longitudinal extension L of the distribution element 34. Through this inlet 36, cleaning liquid may flow into a supply channel 37.

Further, the supply channel 37 of the distribution element 34 comprises a first supply section 38 that directs cleaning liquid in the direction of the first spray bar 16 starting from the inlet 36. For connection, the first supply section 38 comprises a first nozzle 40 at its end, which is configured as a tubular section and is inserted into the first spray bar 16.

The distribution element 34 further comprises a second supply section 42 which directs the cleaning liquid in the direction of the second spray bar 18 starting from the inlet 36. For connection, this second supply section 42 comprises a second nozzle 44 at its end, which is configured as a tubular section and is inserted into the second spray bar 18.

To improve the connection, the first nozzle 40 and the second nozzle 44 have a radially extending thickening at their end with respect to their longitudinal extension. If the first spray bar 16 and/or the second spray bar 18 are configured from an elastomer, for example a rubber, the result is a firm fit on the first nozzle 40 or the second nozzle 44 respectively.

The first nozzle 40 of the distribution element 34 is hollow in its interior, creating a channel through which the cleaning liquid can flow into the first spray bar 16 starting from the inlet 36. For this purpose, the channel of the first nozzle 40, which forms a part of the first supply section 38, has a first cross-section Q1.

The second nozzle 40 of the distribution element 34 is also hollow in its interior, also creating a channel through which the cleaning liquid can flow into the second spray bar 18 starting from the inlet 36. For this purpose, the channel of the second nozzle 44, which forms part of the second supply section 42, has a second cross-section Q2.

The second cross-section Q2 is somewhat smaller than the first cross-section Q1, so that less cleaning liquid is introduced into the second spray bar 18 than into the first spray bar 16. The smaller second cross-section Q2 therefore forms a narrowing of the channel in the second supply section 42.

Both the first spray bar 16 and the second spray bar 18 have spray openings 32 through which the cleaning liquid can escape from the first spray bar 16 or the second spray bar 18 onto the wiping region 30. The spray openings 32 are all approximately equal, thus having substantially the same cross-section. In a variation of the invention, the spray openings 32 may additionally have a different cross-section.

Figure 4:
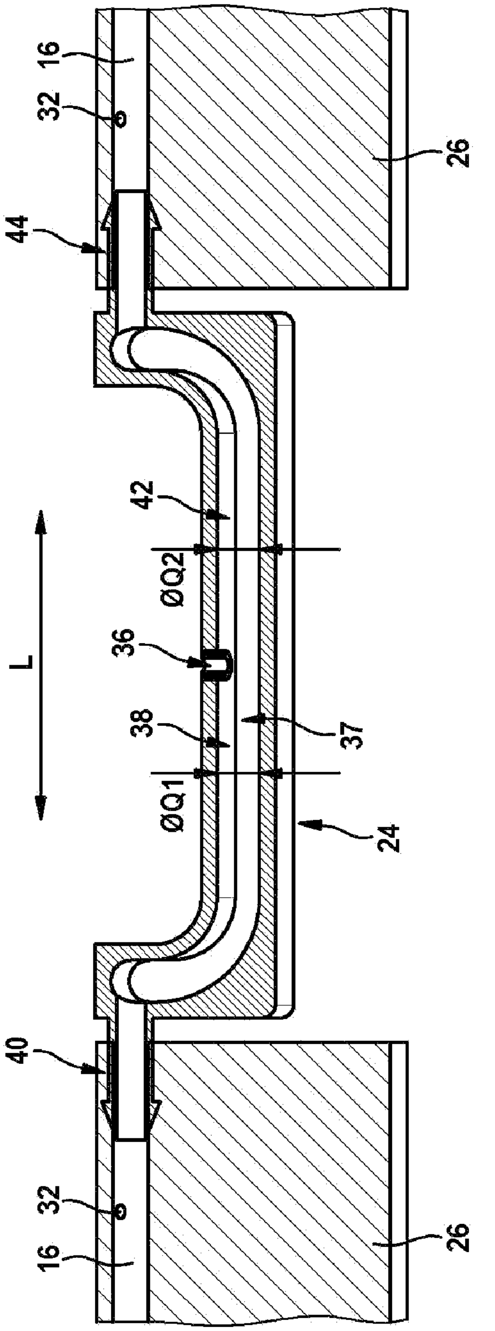

In FIG. 4, the same sectional view as in FIG. 3 is shown in a variation of the invention, however, for reasons of clarity, the adapter 24 was omitted, so that only the distribution element 34 is shown with the first spray bar 16 and the second spray bar 18.

In order to avoid repetition, only the differences to FIG. 3 are described. The embodiments of FIG. 3 therefore also apply correspondingly to this exemplary embodiment.

The first supply section 38 of the supply channel 37 has the first cross-section Q1 adjacent to the inlet 36 and correspondingly the second supply section 42 has the cross-section Q2. The narrowing is formed here by the cross-section of the supply channel 37 being narrowed in the second supply section 42, i.e., the second cross-section Q2. In a supply channel 37, which is approximately rectangular in cross-section, this is achieved by a somewhat higher wall thickness. The second supply section 42 is therefore somewhat narrower than the first supply section 38.

In addition, the inner cross-section of the second nozzle 44 can also have a smaller cross-section than the cross-section of the first nozzle 38.

In both exemplary embodiments, the narrowing of the supply channel 37, which is arranged here in the second supply section 42, is arranged on the side along the longitudinal extension L of the wiper blade 10, which faces the inner circle in the mounted position.

During operation, when a washing program is triggered, cleaning liquid passes through the inlet 36 into the supply channel 37 of the distribution element 34. Thus, the cleaning liquid flows into the first supply section 38 and the second supply section 42 of the supply channel 37. Less cleaning liquid flows into the second spray bar 18 than into the first spray bar 16 through the narrowing arranged in the second supply section 42. Since the second spray bar 18 is arranged closer to the second end 22 of the wiper blade 10 and thus closer to the inner circle IK than the first spray bar 16, less cleaning liquid flows on the side of the inner circle IK onto the wiping region 30 of the glass to be wiped than on the side of the outer circle AK.

The narrowing in the distribution element 34 results in a reduced flow of the cleaning agent on the side along the longitudinal extension L of the wiper blade 10, which faces the inner circle IK in the mounted position.

The distribution element 34 is manufactured in a plastic injection molding process and has at least two parts. For example, it may comprise a base element in which the supply channel 37 is arranged such that a cover is closed in a frictional, interlocking, and/or bonded manner.

In a variation of the invention, the narrowing is arranged in the direction of flow of the cleaning liquid just before the first opening 32. In this case, the distribution element 34 comprises, with reference to the exemplary embodiments from FIGS. 3 and 4, the part of the second spray bar 18 up to the first opening 32. Or in other words, the second spray bar 18 then extends from the first opening 32 to the second end 22 of the wiper blade 10.

The invention claimed is:

1. A wiper blade (10) for a motor vehicle, the wiper blade coupled to a wiper arm (28) and comprising:

an adapter (24) for coupling the wiper blade (10) to the wiper arm (28), wherein the adapter (24) includes a distribution element (34) having an inlet (36) to receive cleaning liquid and a supply channel (37) coupled to the inlet (36) for moving the cleaning liquid through the adapter (24), wherein the wiper blade (10) includes a first, distal spray bar (16) that is coupled to the adapter (24) and extends away from the adapter (24) in a first longitudinal direction for dispensing cleaning liquid out of an opening (32) along a distal portion of the wiper blade (10) that is spaced away from the adapter (24), and a second, proximal spray bar (18) that is coupled to the adapter (24) and extends from the adapter (24) in a second, opposite longitudinal direction for dispensing cleaning liquid out of an opening (32) along a proximal portion of the wiper blade (10) that is spaced away from the adapter (24), wherein the cleaning liquid is configured to first flow through the inlet (36) and into the supply channel (37) within the adapter (24) before then splitting such that a portion of the cleaning liquid passes to the first spray bar (16) and another portion of the cleaning liquid passes to the second spray bar (18), wherein the supply channel (37) within the adapter (24) comprises a first supply section (38) with a first passage configured for cleaning liquid to flow in the first longitudinal direction toward the first spray bar (16) and a second supply section (42) with a second passage configured for cleaning liquid to flow in the second longitudinal direction toward the second spray bar (18), and a narrowing is provided in the second passage of the second supply section (42) such that the second passage is narrower than the first passage, such that the cleaning liquid must pass through a narrower area moving along the second longitudinal direction than along the first longitudinal direction within the adapter (24), wherein the second spray bar (18) has an end that defines an inner circle (IK) when the wiper arm (28) is rotated about an axis, and wherein the first spray bar (16) has an end that defines a larger outer circle (AK) when the wiper arm (28) is rotated about the axis, wherein the narrowing is configured to reduce an amount of cleaning liquid passing through the opening (32) of the second spray bar (18) toward the inner circle (IK).

2. The wiper blade (10) according to claim 1, wherein the second supply section (42) comprises a nozzle (44) for connection to the second spray bar (18) and the narrowing is arranged in the nozzle (44).

3. The wiper blade (10) according to claim 2, wherein a first region of the first supply section (38) is parallel to and offset from both the first spray bar (16) and the second spray bar (18), and wherein a second region of the second supply section (42) is parallel to and offset from both the first spray bar (16) and the second spray bar (18).

4. The wiper blade (10) according to claim 3, wherein the narrowing is located in the second region of the second supply section (42).

5. The wiper blade (10) according to claim 1, wherein the first and/or second spray bars (16, 18) comprise a channel having a plurality of spray openings (32).

6. The wiper blade (10) according to claim 1, wherein the first and/or second spray bars (16, 18) are integrally formed with a wind deflection bar (26).

7. The wiper blade (10) according to claim 1, wherein the distribution element (34) is configured at least in two parts and at least one part is formed from plastic.

8. The wiper blade (10) according to claim 1, wherein the adapter (24) includes a first nozzle (40) at a first end of the adapter (24) that is a tubular section inserted into the first spray bar (16).

9. The wiper blade (10) according to claim 8, wherein the adapter (24) includes a second nozzle (44) at a second, opposite end of the adapter (24) that is a tubular section inserted into the second spray bar (18).

10. The wiper blade (10) according to claim 9, wherein the first supply section (38) extends from the inlet (36) to the first nozzle (40), and wherein the second supply section (42) extends from the inlet (36) to the second nozzle (44).

11. The wiper blade (10) according to claim 10, wherein the second supply section (42) defines the narrowing.

12. The wiper blade (10) according to claim 9, wherein the second nozzle (44) has a smaller diameter than the first nozzle (40), wherein the smaller diameter of the second nozzle defines the narrowing.

* * * * *